United States Patent [19]
Kuchta et al.

[11] Patent Number: 6,018,928
[45] Date of Patent: Feb. 1, 2000

[54] CONSTRUCTION OF AND MOUNTING SYSTEM FOR MACHINERY SIDE PANELS

[75] Inventors: Richard Kuchta, Shickshinny, Pa.; Joseph Vivirito, South Windsor, Conn.

[73] Assignee: Gerber Technology, Inc., Tolland, Conn.

[21] Appl. No.: 09/150,273

[22] Filed: Sep. 9, 1998

[51] Int. Cl.⁷ .................................................... F04C 2/22
[52] U.S. Cl. .................. 52/800.1; 52/800.11; 52/630; 52/790.1
[58] Field of Search ............... 52/800.1, 800.11, 52/630, 790.1

[56] References Cited

U.S. PATENT DOCUMENTS

| | | | |
|---|---|---|---|
| 2,605,157 | 7/1952 | Reitzel | 52/800.11 X |
| 3,184,013 | 5/1965 | Pavlecka | 52/790.1 X |
| 4,531,331 | 7/1985 | Itagaki | 52/630 X |
| 4,606,170 | 8/1986 | Mendenhall | 52/800.1 X |
| 4,719,731 | 1/1988 | Ravotti et al. | 52/239 |
| 4,813,197 | 3/1989 | Teisen-Simony | 52/800.1 X |
| 5,400,560 | 3/1995 | Hellwig et al. | 52/800.1 X |

FOREIGN PATENT DOCUMENTS

| | | | |
|---|---|---|---|
| 4231701 | 3/1994 | Germany | 52/800.11 |
| 2016569 | 9/1979 | United Kingdom | 52/800.11 |

*Primary Examiner*—Carl D. Friedman
*Assistant Examiner*—Phi Dieu Tran A
*Attorney, Agent, or Firm*—McCormick, Paulding & Huber LLP

[57] ABSTRACT

In machinery panel and mounting system therefore, a shaped panel shell is provided that includes a finished outer surface, and an inner surface that defines an interior area. A reinforcing member defining at least one recess is positioned in the interior area and attached to the inner surface of the shaped panel shell. At least one bracket adapted to be mounted on a machine surface, includes a protrusion receivable within a recess defined by the reinforcing member to support the panel on the machine.

10 Claims, 2 Drawing Sheets

CONSTRUCTION OF AND MOUNTING SYSTEM FOR MACHINERY SIDE PANELS

FIELD OF THE INVENTION

The present invention relates generally to machinery side panels, and is more specifically directed to panels reinforced by bonding an extrusion to an inferior area of the side panel, the extrusion also being used to hang the panels from brackets mounted to the sides of a machine.

BACKGROUND OF THE INVENTION

In order to obtain and retain customers in today's marketplace, companies must not only be efficient and minimize costs, their facilities must also be aesthetically pleasing. To accomplish this, many machine manufacturers employ decorative panels incorporating curved surfaces and other effects pleasing to the eye, on their machines. Generally these panels are fabricated from plastic or fiberglass and are attached to the sides of a machine using screws or other commonly known fasteners.

A problem that occurs with panels of the type described above is due in part to the fact that the machine is used in an industrial setting. Therefore, during operation, or when a problem occurs, it is not uncommon for workers to climb on, or partially support themselves on the machine. Accordingly, if they happen to step on or place undue weight on the side panels, the panels could crack, or even fracture. Another difficulty associated with known polymeric or fiberglass side panels is that they tend to vibrate during operation of the machinery upon which they are mounted. Yet another problem occurs where the panels are long and involve large unsupported lengths. In this situation the panels tend to sag and/or crack.

Based on the foregoing, it is the general object of the present invention to provide machinery side panels and mountings therefore that overcome the problems and drawbacks of prior art side panels.

It is a more specific object of the present invention to provide reinforced side panels which mount easily to a particular machine.

SUMMARY OF THE INVENTION

The present invention is directed to a machinery panel and mounting system therefore that includes a shaped panel shell defining a finished outer surface, that may include various contours and other aesthetically pleasing features, and an inner surface defining an interior area. A reinforcing member is positioned in the interior area and attached to the inner surface defined by the shaped panel shell. At least one bracket is also provided and is adapted to be coupled to a machine surface such as the side surfaces of a frame for a sheet material cutter table. The bracket includes a protrusion adapted to seat in a recess defined by the reinforcing member, to support the panel when mounted on a machine.

Preferably, the reinforcing member is a metallic extrusion that includes an abutment surface engageable with the inner surface of the shaped panel shell. In the preferred embodiment of the present invention, a layer of adhesive, such as, but not limited to epoxy is interposed between and bonds the abutment surface to the inner surface of the shaped panel shell. In addition, the abutment surface defines at least one lip portion extending therefrom. A layer of composite material is spread over the lip portion to further secure the reinforcing member to the shaped panel shell.

The present invention also resides in a method for producing the above-described machinery panel wherein the shaped panel shell is fabricated from a composite material, and the abutment surface of the reinforcing member is bonded to the inner surface of the shell. A layer of composite material is then spread over the lip defined by the abutment surface to further secure the reinforcing member to the shaped panel shell.

DETAILED DESCRIPTION OF THE PREFERRED EMBODIMENT

Figure 1:
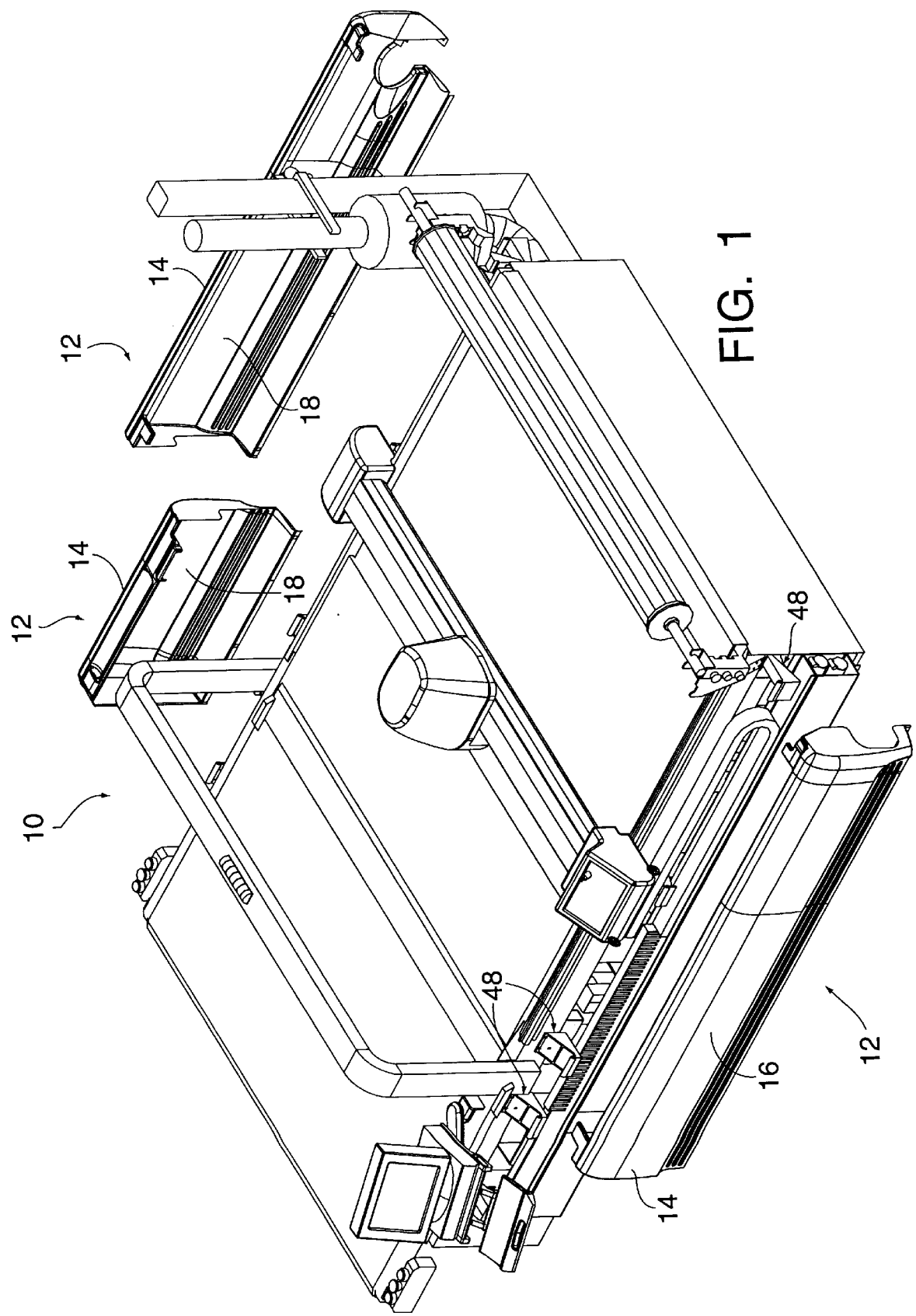
FIG. 1 is a partially exploded perspective view of a cutter table employing machine panels of the present invention.

FIG. 1 illustrates a garment cutter table 10 that employs the panels and mounting brackets of the present invention. Since the components of the cutter table other than those described herein do not constitute part of the present invention, they will not be described herein.

Figure 2:
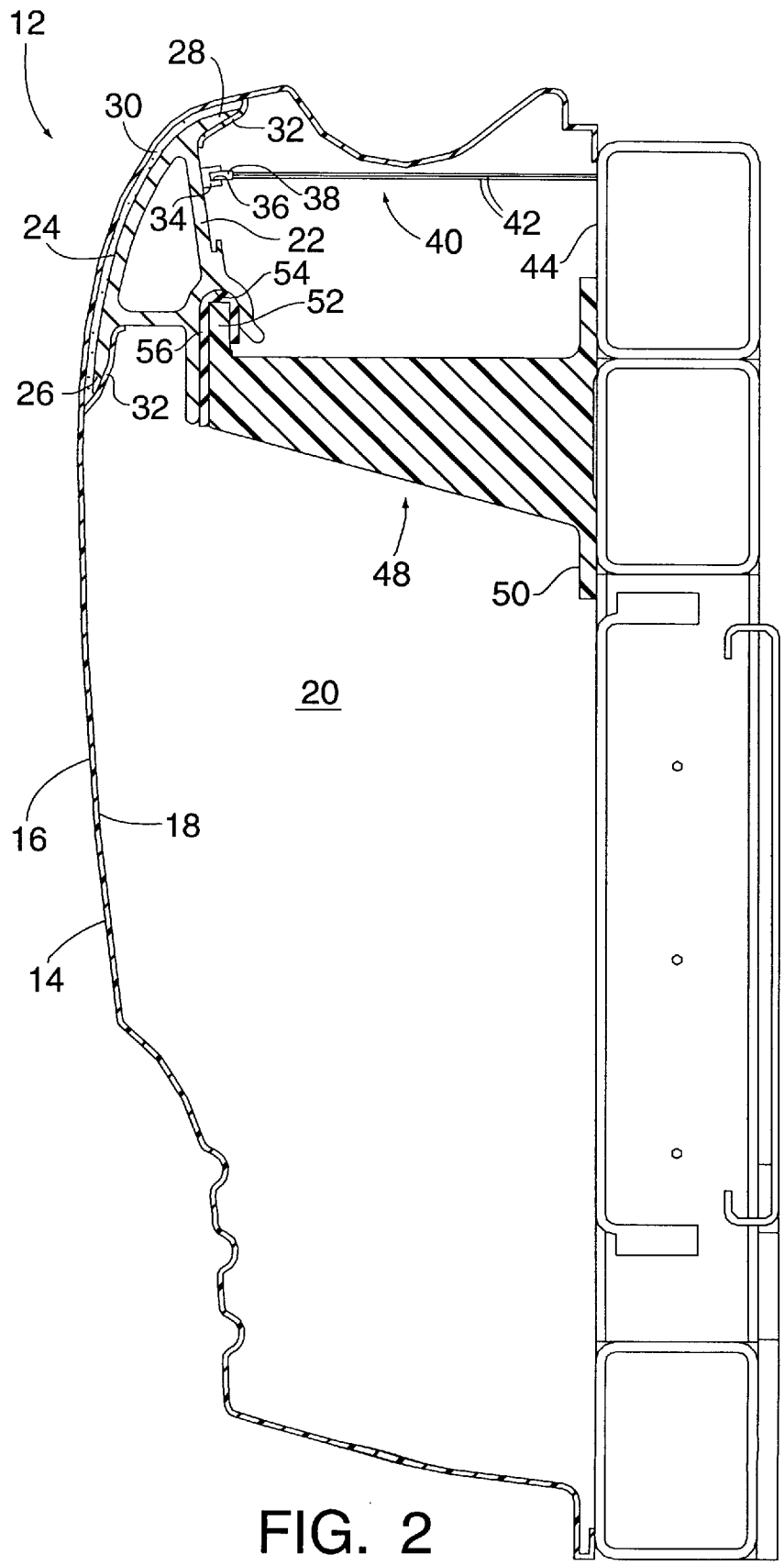
FIG. 2 is cross sectional, side elevational view showing the machine panel of FIG. 1 mounted on a side of a machine.

Referring to FIGS. 1 and 2, the machinery panels generally designated by the reference number 12 each include a shaped panel shell 14 having a finished outer surface 16, and an inner surface 18 defining an interior area 20. Preferably, the shaped panel shell is fabricated from a composite material, such as fiberglass. However, the invention is not limited in this regard as other materials, such as plastics, aluminum, or sheet metal can be substituted without departing from the broader aspects of the present invention.

As shown in FIG. 2, a reinforcing member generally designated by the reference number 22 is positioned in the interior area 20 defined by the shaped panel shell 12. In the illustrated embodiment, the reinforcing member 22 includes an abutment surface 24 defining an opposed pair of outwardly extending lip portions, 26 and 28. The abutment surface 24 is countered to engage the inner surface 18 of the shaped panel shell 12. A layer of adhesive 30, preferably, but not limited to epoxy, is interposed between and bonds the abutment surface 24 to the inner surface 18 of the shaped panel shell 12. In addition, a layer of fiberglass 32 is spread over the lip portions 26 and 28 further securing the reinforcing member 22 to the shaped panel shell 12. In this manner, the reinforcing members allow the machine panels to span very large unsupported lengths.

Still referring to FIG. 2, the reinforcing member 22 further includes a boss 34 defining a groove 36 adapted to receive and releasably retain a portion 38 of a seal 40. Preferably the seal includes a plurality of bristles 42 that extend between the shaped panel shell, and a machine surface 44. While a seal employing bristles has been shown and described, the present invention is not limited in this regard as other seals, such as an elastomeric seal can be substituted without departing from the broader aspects of the present invention.

The reinforcing member 22 can extend entirely across the length of the shaped panel shell 12, or only part-way across, depending on the particular machine configuration. In addition, the reinforcing member 24 is preferably an extrusion formed from a suitable material, such as, but not limited to metal. However, the present invention is not limited in this regard as the reinforcing member can also be fabricated by other techniques known to those skilled in the pertinent art, such as casting, or welding without departing from the broader aspects of the present invention. Additionally, the reinforcing member 24 need not be metallic, and could be formed from a composite or polymeric material.

As shown in FIGS. 1 and 2, the machine panels 12 are mounted onto the sides of a machine via brackets generally designated by the number 48. In the embodiment illustrated in FIG. 2, the brackets 48 each define a flange portion 50 adapted to be mounted to the machine surface 44. In addition, each of the brackets also defines a protrusion 52 adapted to be received in a recess 54 defined by the reinforcing member 24. To reduce vibratory loads transferred from the machine to the machine panels, a layer of plastic, or elastomeric material 56 is placed over the protrusion 52.

While preferred embodiments have been shown and described, various modifications and substitutions may be made without departing from the spirit and scope of the invention. Accordingly, it is to be understood that the present invention has been described by way of example, and not by limitation.

What is claimed is:

1. A machinery panel and mounting system therefore, comprising:

a shaped panel shell defining a finished outer surface, and an inner surface defining an interior area;

a reinforcing member defining at least one recess, said reinforcing member being positioned in said interior area attached to said inner surface of said shaped panel shell;

at least one bracket adapted to be coupled to a machine surface, said bracket defining a protrusion receivable within said recess defined by said reinforcing member to support said panel on said machine;

said reinforcing member defines a groove adjacent to said recess; and sealing means including an edge surface seating in said groove, such that said sealing means extends between said shaped panel shell and said machine when said panel is mounted therein;

wherein said sealing means includes a plurality of bristles extending between said shaped panel shell and said machine.

2. A machinery panel and mounting system therefore, as defined by claim 1, wherein:

said reinforcing member includes an abutment surface engageable with said inner surface of said shaped panel shell, said abutment surface defines at least one lip portion; and wherein a layer of adhesive is interposed between and bonds said abutment surface to said inner surface of said shaped panel shell.

3. A machinery panel and mounting system therefore, as defined by claim 2, wherein:

said shaped panel shell is fabricated from fiberglass; and a layer of fiberglass is spread over said lip portion, further securing said reinforcing member to said inner surface of said shaped panel shell.

4. A machinery panel and mounting system therefore, as defined by claim 2, wherein said reinforcing member is an extrusion.

5. A machinery panel and mounting system therefore, as defined by claim 4, wherein said abutment surface of said extrusion includes opposed first and second lip portions.

6. A machinery panel and mounting system therefore, as defined by claim 5, wherein:

said shaped panel shell is fabricated from fiberglass; and a layer of fiberglass is spread over said first and second lip portions, further securing said reinforcing member to said inner surface of said shaped panel shell.

7. A machinery panel and mounting system therefore, as defined by claim 4, wherein said extrusion is metallic.

8. A machinery panel and mounting system therefore, as defined by claim 1, further comprising a layer of non-metallic material positioned over said protrusion defined by said bracket.

9. A machinery panel and mounting system therefore, as defined by claim 8, wherein said layer of non-metallic material is elastomeric.

10. A machinery panel and mounting system therefore, as defined by claim 9, wherein said layer of non-metallic material is polymeric.

* * * * *

UNITED STATES PATENT AND TRADEMARK OFFICE
CERTIFICATE OF CORRECTION

| | |
|---|---|
| PATENT NO. | : 6,018,928 |
| DATED | : February 1, 2000 |
| INVENTOR(S) | : Kuchta et al. |

It is certified that error appears in the above-identified patent and that said Letters Patent is hereby corrected as shown below:

<u>Column 2,</u>
Lines 59 and 66, after "reinforcing member", delete "24" and insert -- 22 --.

Signed and Sealed this

Twenty-fifth Day of June, 2002

Attest:

Attesting Officer

JAMES E. ROGAN
*Director of the United States Patent and Trademark Office*